United States Patent [19]
Mandzy et al.

[11] Patent Number: 5,639,117
[45] Date of Patent: Jun. 17, 1997

[54] VEHICLE OCCUPANT RESTRAINT APPARATUS

[75] Inventors: John Mandzy; Steven Joseph Brown, both of Pittsfield, Mass.; Neale Arthur Messina, Philadelphia, Pa.; Larry Stefan Ingram, Lawrenceville, N.J.

[73] Assignee: Lockheed Martin Corporation, Bethesda, Md.

[21] Appl. No.: 658,436

[22] Filed: Jun. 5, 1996

[51] Int. Cl.$^6$ ................................ B60R 21/26
[52] U.S. Cl. ................ 280/741; 280/736; 280/737; 102/530
[58] Field of Search ................... 280/741, 736, 280/737, 742; 102/530, 531; 422/164; 222/3; 89/7

[56] References Cited

U.S. PATENT DOCUMENTS

| | | | |
|---|---|---|---|
| 4,341,147 | 7/1982 | Mayer | 89/7 |
| 4,523,507 | 6/1985 | Magoon | 89/7 |
| 4,523,508 | 6/1985 | Mayer et al. | 89/7 |
| 4,693,165 | 9/1987 | Magoon et al. | 89/7 |
| 4,745,841 | 5/1988 | Magoon et al. | 89/7 |
| 4,907,486 | 3/1990 | Mayer | 89/7 |
| 5,060,973 | 10/1991 | Giovanetti | 280/736 |
| 5,301,979 | 4/1994 | Allard | 280/737 |
| 5,441,302 | 8/1995 | Johnson et al. | 280/736 |
| 5,487,561 | 1/1996 | Mandzy et al. | 280/741 |
| 5,516,147 | 5/1996 | Clark et al. | 280/741 X |

*Primary Examiner*—Christopher P. Ellis
*Attorney, Agent, or Firm*—Robert A. Cahill; Geoffrey H. Krauss

[57] ABSTRACT

To achieve programmed inflation of an airbag in a vehicle occupant restraint apparatus, movement of a piston, that separates a combustion chamber from a liquid propellant reservoir, is utilized to vary the opening size of an injection port through which liquid propellant is regeneratively pumped from the reservoir into the combustion chamber for combustion, such that the rate at which the bag inflation gas is generated during an inflation period may be controlled.

54 Claims, 5 Drawing Sheets

VEHICLE OCCUPANT RESTRAINT APPARATUS

FIELD OF THE INVENTION

The present invention relates to safety apparatus, and particularly to passive restraint apparatus utilizing an inflatable airbag for preventing serious injury to occupants of a motor vehicle involved in an accident.

BACKGROUND OF THE INVENTION

"Passive" restraint apparatus, which requires no action by a vehicle occupant to render operative, as contrasted to "active" restraint apparatus requiring a conscious effort by an occupant to render operative (such as conventional seat belts), are now commonly included as standard equipment in motor vehicles due to government agency, insurance industry, and consumer pressures. Experience and testing have shown that the most effective passive occupant restraint approach is to abruptly (in a matter of milliseconds) inflate an airbag automatically in response to a high impact accident. The inflated airbag cushions a vehicle occupant from the effects of the accident for an interval sufficient to prevent serious injury.

The mechanics for timely inflating an airbag are basically of two types. One type involves storing a liquefied gas under high pressure in a reservoir. On impact, the liquefied gas is released, which then converts to a gas that inflates the airbag.

The second basic type of airbag inflation apparatus uses ignitable propellants that are combusted to rapidly generating a large volume of bag inflation gas by exothermic reaction. Heretofore, the propellants invariably have been in a solid or granular form and comprised of low energy compositions, such as an alkali metal azide, cupric oxide, boron nitrate, etc. The solid propellants need not be stored under pressure, are stable over time under varying ambient conditions, and are convenient to package in a passive restraint apparatus.

As an alternative to the use of propellants in solid or granular form as the inflation gas generator, liquid propellants for this purpose are being investigated. Viable approaches to using a liquid propellant in an airbag inflator are disclosed in U.S. Pat. No. 5,060,973, issued to Giovanetti, and U.S. Pat. No. 5,487,561, issued to Mandzy et al. The numerous advantages afforded by the use of liquid propellants in an airbag inflation apparatus are noted in these patents, the disclosures of which are incorporated herein by reference.

To protect passengers, as well as drivers of vehicles, airbags are now being installed in dashboards for protection against frontal collisions and in doors for protection against side impact collisions. Bag size and inflation parameters are dependent on the particular installation site, and each installation varies according to vehicle type and make. Thus, bag inflators must be designed not only to satisfy the unique inflation parameters appropriate for each particular installation site, but also must be sized to fit into the available space that is unique to each installation site. Regarding inflation parameters, recent studies have indicated that particularly abrupt bag inflation, rather than protecting vehicle occupants in the event of a high impact accident, may instead inflict injury, even death, to occupants; this is particularly so in the case of children.

SUMMARY OF THE INVENTION

It is an objective of the present invention to provide an improved apparatus for inflating an airbag using a liquid propellant, wherein combustion of the liquid propellant may be controlled to achieve a programmed rate of bag inflation appropriate to the installation site of the apparatus in a motor vehicle and thus protect occupants from the effects of both an accident and bag inflation itself.

To achieve this objective in accordance with the present invention, there is provided a vehicle occupant restraint apparatus that comprises a sensor, an inflatable airbag, a housing having a vent in fluid communication with the airbag, a cylinder provided in the housing, and a piston slidably received in the cylinder to define, to a back side, a reservoir containing a liquid propellant and, to a front side, a combustion chamber in fluid communication with the housing vent.

The apparatus further includes an inflation initiator operable, in response to a vehicle collision detected by the sensor, to generate fluid pressure in the combustion chamber that acts on the piston to generate amplified fluid pressure in the reservoir, and a liquid propellant injection port provided between the reservoir and the combustion chamber, the injection port being closed while the piston is in a quiescent position and opening as the piston is moved in a rearward direction to decrease reservoir volume, an opening area of the injection port varying with piston travel in the rearward direction to achieve a variable flow rate of liquid propellant regeneratively pumped by the amplified reservoir fluid pressure through the injection port into the combustion chamber for ignition and combustion to generate, by exothermic reaction, a gas flowing through the housing vent to produce inflation of the airbag.

Additional features, advantages and objectives of the present invention will be set forth in the description that follows and in part will be apparent from the description, or may be learned by practice of the invention. The objectives and advantages of the present invention will be realized and obtained by the apparatus particularly pointed out in the following written description and the appended claims, as well in the accompanying drawings.

It will be understood that both the foregoing general description and the following detailed description are exemplary and explanatory and are intended to provide further explanation of the invention as claimed.

The accompanying drawings are intended to provide a further understanding of the invention and are incorporated in and constitute a part of the specification, illustrate a preferred embodiment of the invention, and together with the description, serve to explain the principles of the invention.

BRIEF DESCRIPTION OF THE DRAWINGS

Like reference numerals refer to corresponding parts throughout the several views of the drawings.

DETAILED DESCRIPTION OF PREFERRED EMBODIMENTS

Figure 1:
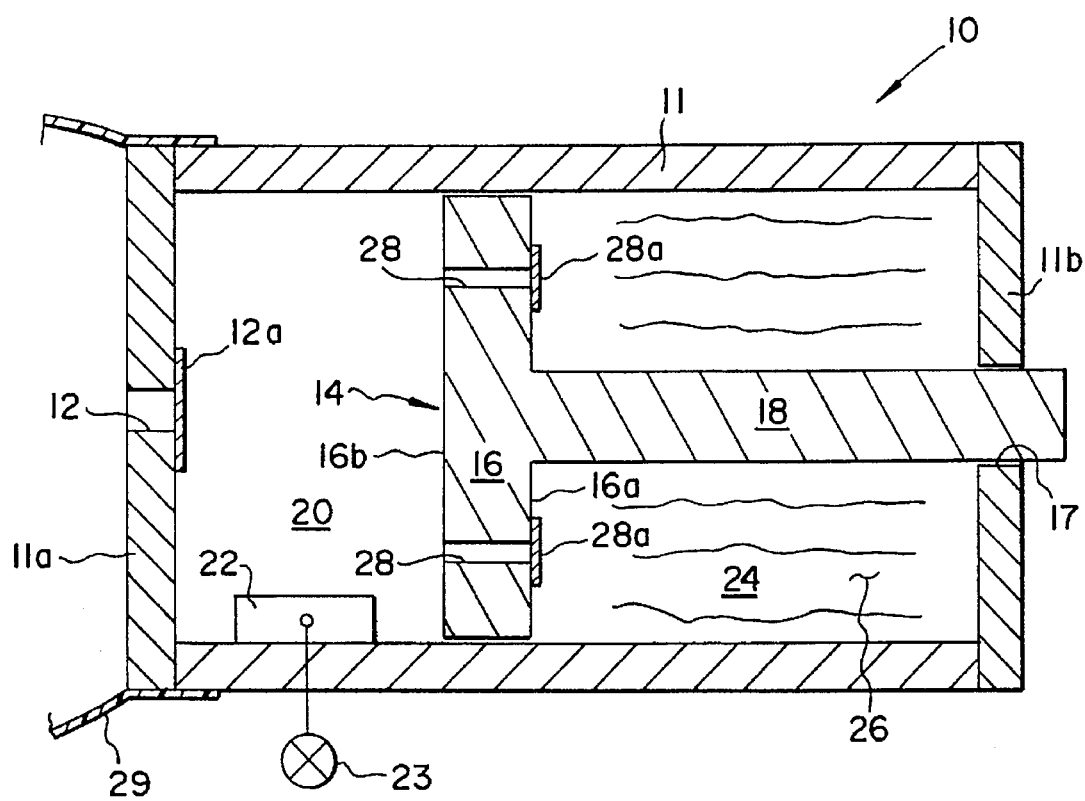
FIG. 1 is a sectional view of an airbag inflator used to explain the regenerative operating feature of the present invention.

The airbag inflator of FIG. 1 is presented to explain the regenerative fluid pumping feature of the embodiments of the invention illustrated in FIGS. 3–7. As seen in FIG. 1, an inflator, generally indicated at 10, includes an enclosed cylindrical housing 11 having a vent 12 in a front endwall 11a through which a gas is exhausted to inflate an airbag. Prior to inflation, vent 12 is closed by a frangible seal 12a. The interior surface of the housing provides a cylinder in which is slidably received a piston, generally indicated at 14. This piston is comprised of a piston head 16 and a piston rod 18 joined at a forward end to the piston head and extending rearwardly through a close-fitting, fluid-sealed opening 17 in the rear endwall 11b of the housing. The peripheral surface of piston head and the cylinder surface are likewise in intimate, fluid-sealed relation. It is understood that the term "cylinder" appearing in the specification and claims is to be construed in a hydraulic sense, rather than a particular geometric shape, although a cylindrical shape is preferred.

Piston head 16 divides the housing interior (cylinder) into a combustion chamber 20, containing a pyrotechnic initiator 22, and a reservoir 24, containing a liquid propellant 26. It will be appreciated that the initiator may be carried on or recessed in the face 16b of piston head 16. As disclosed in the cited Giovanetti and Mandzy et al. patents, the liquid propellant may be a hydroxyl ammonium nitrate-based liquid monopropellant. A particularly suitable liquid propellant composition comprises, by mass, approximately 60% hydroxyl ammonium nitrate as an oxidizer, 20% triethyl ammonium nitrate as a fuel, and 20% water as a solvent. Ports 28, drilled through the piston head to provide fluid communication between reservoir 24 and combustion chamber 20, are initially closed by frangible seals 28a.

To inflate an airbag, attached to inflator 10 and fragmentally indicated at 29, the pyrotechnic initiator 22 is detonated to pressurize combustion chamber 20. Pressurization of the combustion chamber also pressurizes the liquid propellant 26 in the reservoir 24. By virtue of the presence of piston rod 18, the surface area of the rear face 16a of the piston head exposed to the liquid propellant is less than the surface area of the front face 16b of the piston head exposed to the fluid pressure build up in combustion chamber 20. Because of this surface area differential of the piston head faces, the reservoir fluid pressure must exceed the combustion chamber fluid pressure to achieve a balance of the opposing forces acting on the piston head. Consequently, a fluid pressure amplification effect is achieved in the liquid propellant reservoir. That is, the liquid propellant fluid pressure tracks the fluid pressure in the combustion chamber, but always exceeds the combustion chamber fluid pressure by a multiplication factor equal to the differential surface area of the piston faces.

This being the case, a regenerative fluid pressure differential is continuously available to initially rupture seals 28a and then to pump liquid propellant from reservoir 24 through piston head ports 28 into combustion chamber 20 for ignition by the combusting by-products of the initiator output. With continued pumping of the liquid propellant from the reservoir into the combustion chamber for complete combustion, piston 14 is driven rearwardly to take up the contracting volume of the liquid propellant 26 in the reservoir 24. The self-sustaining combustion of the liquid propellant pumped into the combustion chamber generates combustion gases that flow through vent 12 to inflate the airbag upon rupture of seal 12a.

Figure 2:
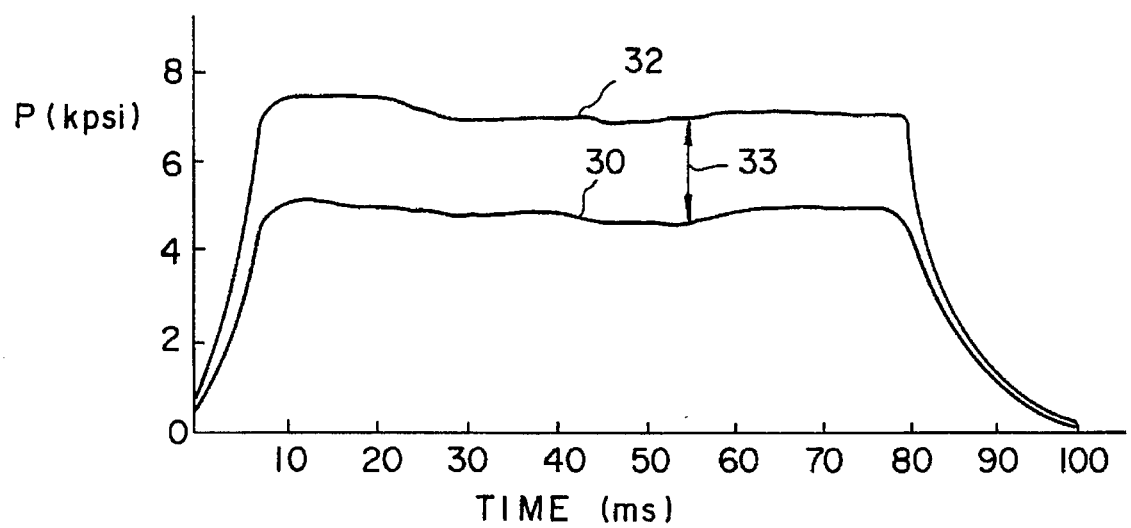
FIG. 2 is a graph including curves illustrating representative fluid pressures generated in the inflator of FIG. 1 during an airbag inflation operation.

FIG. 2 graphically illustrates this regenerative pumping feature, wherein curve 30 represents combustion chamber fluid pressure and curve 32 represents reservoir fluid pressure over the time period of a bag inflation operation. It can be seen that the fluid pressure of the liquid propellant is continuously greater than the fluid pressure in the combustion chamber throughout the inflation operation, and the difference between these fluid pressures, indicated at 33, represents the pressure available at any time during the inflation period to pump liquid propellant through ports 28 into the combustion chamber.

It will be appreciated that airbag inflation rate is determined by the combustion rate of the liquid propellant in the combustion chamber, which, in turn, is determined by the flow rate of the liquid propellant into the combustion chamber 20 from reservoir 24. However, since the effective liquid propellant pumping pressure is essentially fixed by the area differential between the front and rear faces of the piston head, and the sizes of the liquid propellant ports 28 through the piston head are also fixed, inflator 10 of FIG. 1 lacks the capability of varying the rate of flow of inflation gas into the airbag. That is, there is no capability, for example, to begin bag deployment at a slow rate and then, at an appropriate time during the inflation period, significantly increase the inflation rate and then reduce inflation rate to complete bag deployment.

Figure 3:
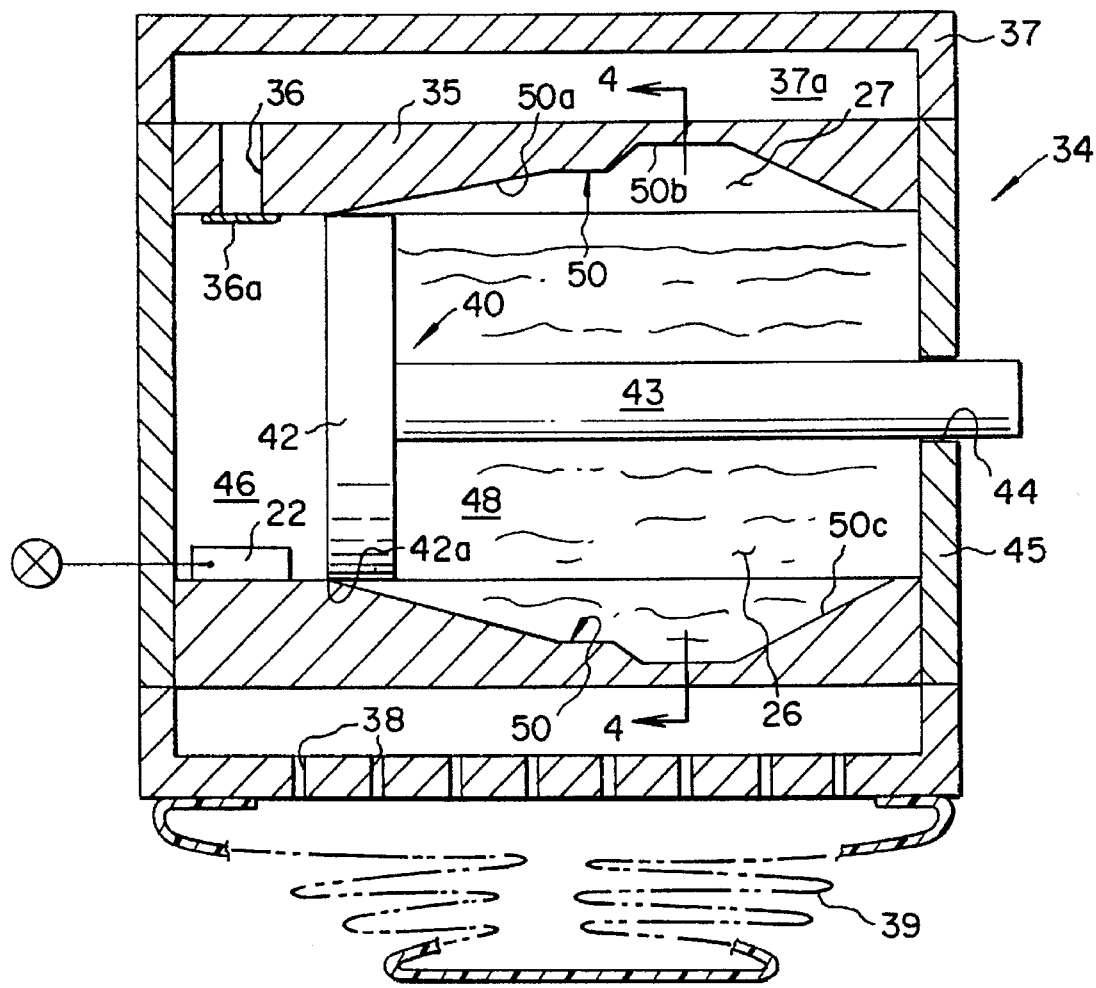
FIG. 3 is a sectional view of a vehicle occupant restraint apparatus in accordance with one embodiment of the invention.

FIG. 3 illustrates a vehicle occupant restraint apparatus according to one embodiment of the invention that has the capability of varying the inflation rate of an airbag. In this embodiment, an inflator, generally indicated at 34, includes an inner housing 35 having a vent 36 machined in its cylindrical sidewall. This vent is initially closed by a frangible seal 36a. An outer cylindrical housing 37 surrounding and sealed to housing 35 provides an annular cavity 37a, through which inflation gases are channelled from vent 36 to a plurality of vents 38 in housing 37. An airbag 39 is secured to housing 37 in position to be inflated by the gases exhausted through vents 38. The housing walls defining cavity 37a provide cooling surfaces for reducing combustion gas temperature prior to inflating airbag 39.

A piston, generally indicated at 40, includes a piston head 42 slidingly received in a cylinder provided by the interior surface of housing 35 and a piston rod 43 extending from the piston head rearwardly through a close-fitting, fluid-sealed hole 44 machined in the housing rear endwall 45. Piston head 42 divides the interior of housing 35 into a combustion chamber 46 and a reservoir 48 containing liquid propellant 26. In accordance with a feature of this embodiment of the invention, the liquid propellant does not completely fill the reservoir 48, so as to leave a pocket 27 of compressible fluid, such as air, in the reservoir.

Figure 4:
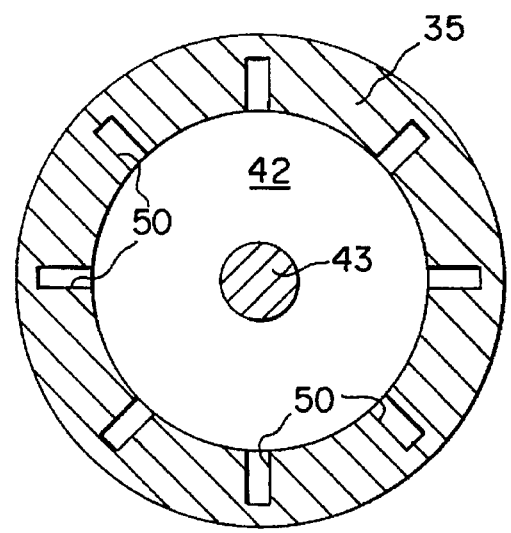
FIG. 4 is a sectional view taken along line 4—4 of FIG. 3.

With piston 40 in its quiescent position seen in FIG. 3, a forward annular section 42a of the cylindrical peripheral surface of piston head 42 is in close-fitting, fluid-sealed relation with a cylindrical section of the housing interior surface, as indicated at 41, to prevent leakage of liquid propellant from the reservoir 48 into the combustion chamber 46. In contrast to the piston head of FIG. 1, piston head 42 in FIG. 3 is not machined with injection ports, and thus, there is no need for frangible seals to confine the liquid propellant in the reservoir. However, in accordance with a feature of the present invention, the cylindrical interior surface of the housing rearwardly of section 41 is machined with a plurality of angularly spaced and axially elongated grooves 50, as also illustrated in FIG. 4. While eight such grooves are illustrated, it will be appreciated that a greater or lesser number of such grooves may be utilized in practicing the present invention.

To achieve a variable rate of liquid propellant flow from the reservoir into the combustion chamber, the depths of the grooves are varied along their lengths as illustrated in FIG. 3. Alternatively, the groove widths or a combination of widths and depths may be varied along their lengths. Or, constant area grooves may be employed but their lengths and beginning/ending axial locations may vary. When the combustion chamber 46 and reservoir 48 are pressurized by firing the pyrotechnic initiator 22 in response to a high impact vehicular accident detected by an inertial sensor 23, the air pocket 27 is compressed, allowing piston 40 to move rearwardly of the liquid seal interfacial contact section 41. Consequently, injection port openings are created as section 42a of piston head 42 moves beyond the leading ends of grooves 50. Liquid propellant 26 is then injected into combustion chamber 46 by the regenerative pumping action generated by the differential face surface areas of piston head 42. The injected liquid propellant is combusted to begin bag inflation when seal 38 ruptures to open vent 37. With continued rearward stroke of piston 40, the injection port openings increase in opening area as the depths of the grooves facing the piston head peripheral surface progressively increase, as indicated at 50a, and the rate of liquid propellant injection into the combustion chamber correspondingly increases.

By virtue of the groove depth profile illustrated in FIG. 3, when approximately half of the initial liquid propellant charge in reservoir 48 has been pumped into the combustion chamber, the groove depths are at a maximum, as indicated at 50b, to accommodate maximum flow of liquid propellant into the combustion chamber. Thus, at this point in the bag deployment period, the rate of airbag inflation is at a maximum. Thereafter, as indicated by the groove profile, groove depth rapidly decreases, as indicated at 50c, to reduce the rate of airbag inflation leading up to full deployment.

Such programmed bag inflation provides for a slow rate of inflation during the initial deployment stage to less forcibly move an occupant back into a position more conducive to rapid inflation during a later stage of deployment. Thus, the potential for occupant injury due to airbag deployment may be minimized.

Figure 5:
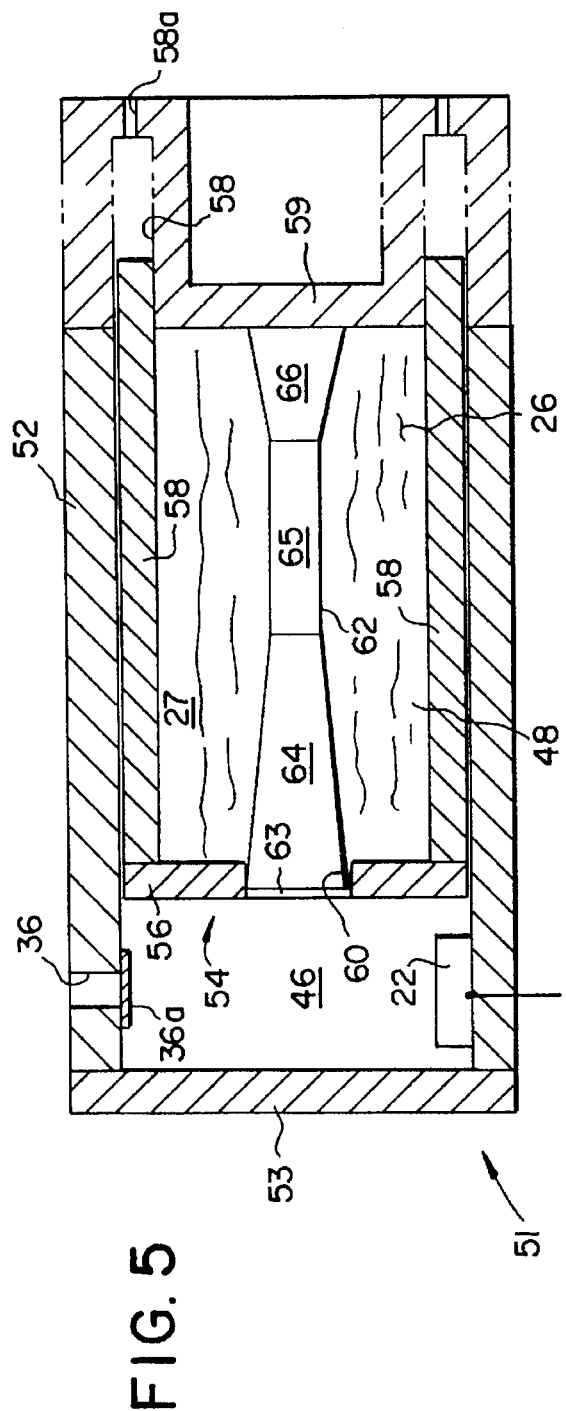
FIG. 5 is a sectional view of a vehicle occupant restraint apparatus in accordance with a second embodiment of the present invention.

In the embodiment of the invention seen in FIG. 5, a vehicle occupant restraint apparatus comprises an inflator, generally indicated at 51, that includes a cylindrical housing 52 in which a piston, generally indicated at 54, is slidingly received. This piston consists of a piston head 56 and cylindrical skirt 57 extending from the piston head rearwardly along the inner cylindrical surface of the housing and slidingly received in close-fitting, fluid-sealed relation into an annular chamber 58 machined in a rear endwall 59 of the housing. Annular chamber 58 is vented, as indicated at 58a. Piston head 56 divides the interior of the housing into a combustion chamber 46 and a reservoir 48 containing liquid propellent 26 and an air pocket 27. A central injection port 60 is drilled axially through the piston head. A needle valve element 62 is affixed at its rearward end to housing endwall 59 and extends axially through the reservoir to project a forward end through injection port 60. The forward end of the needle valve element is machined to provide an annular surface 63 in fluid sealed, sliding contact with the cylindrical sidewall of injection port 60.

The needle valve element is further machined to provide a peripheral surface profile that varies in stages along its axial length. Thus, in the example illustrated in FIG. 5, rearwardly from the fluid sealing surface section 63, the valve member is machined with conical profile section 64 of progressively decreasing diameter, followed by a cylindrical section 65 of a uniform reduced diameter, and ending in a conical profile section 66 of increasing diameter concluded at the point of needle valve element attachment to the housing endwall.

When the pyrotechnic initiator 22 is fired to pressurize the combustion chamber 46 and the reservoir 48, air pocket 27 is compressed to allow piston 54 to begin its rearward stroke. Virtually immediately, the piston head 56 clears the fluid sealing section 63 of needle valve element 62, and thus injection port 60 is opened to begin regenerative pumping of liquid propellant 26 into the combustion chamber for combustion. Seal 36a ruptures to open vent 36, and bag inflation begins.

As injection port 60 in the piston head moves along the conical stage 64 of the needle valve element 62, the annular opening area of the injection port 60, defined between the needle valve element cross section and the port sidewall, progressively increases. So does the flow of the liquid propellent regeneratively pumped from the reservoir into the combustion chamber by virtue of the differential face surface area of the piston head 56 created by the presence of cylindrical skirt 58. When the piston head moves past the minimum diameter cylindrical section 65 of the needle valve member, the opening area of the injection port 60 is at a maximum to accommodate maximum injection rate of liquid propellant into the combustion chamber and thus produce maximum inflation rate of bag deployment. As the piston head approaches the housing endwall, the concluding conical section 66 of the needle valve element progressively closes down the injection port as the remaining liquid propellant is pumped into the combustion chamber and combusted to complete bag deployment.

It will be appreciated that, instead of needle valve element 62 extending forwardly from rear endwall 59, a comparable valve element may be appropriately surface profiled so that it can be affixed to front endwall 53 and extend rearwardly through injection port 60. While not show, inflator 51 may be equipped with an outer cylindrical housing 37, as in the inflator embodiment of FIG. 3.

Figure 6:
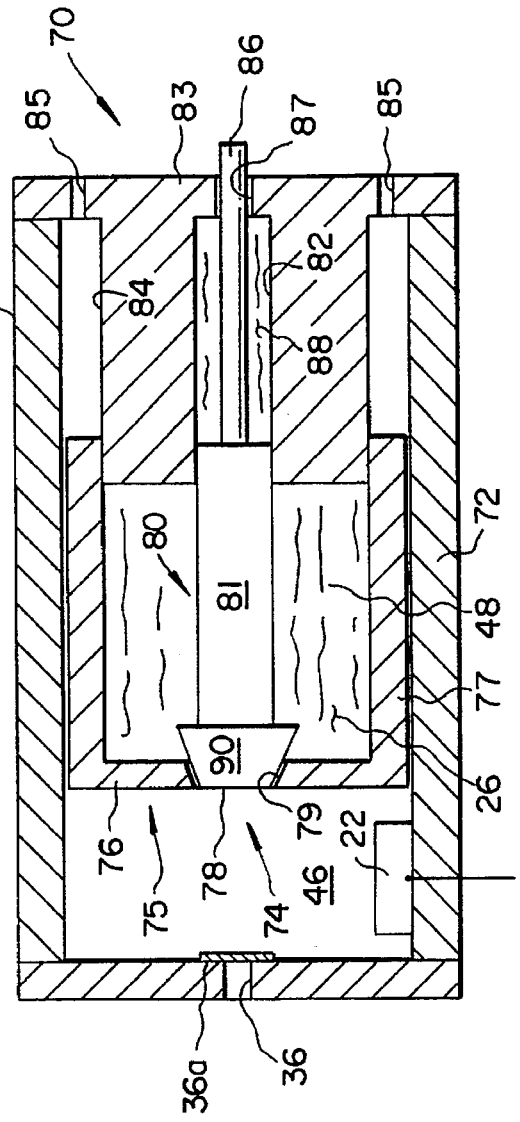
FIG. 6 is a sectional view of a vehicle occupant restraint apparatus according to a further embodiment of the present invention.

In the vehicle occupant restraint apparatus embodiment of the invention as seen in FIG. 6, an inflator, generally indicated at 70, includes a cylindrical housing 72 for slidably receiving a two part piston, generally indicated at 74. This piston includes an outer cup-shaped piston member, generally indicated at 75 and including a piston head 76 joined with a cylindrical skirt 77 slidably engaging the cylindrical interior surface of the housing. Piston head 76 separates combustion chamber 46 from reservoir 48 filled with liquid propellant 26. An injection port 78, having a conical sidewall serving as a valve seat 79, is machined at a central location in piston head 76.

The second piston part is an inner, control piston member generally indicated at 80. This piston is formed having a cylindrical body 81 that is slidably received in a cylindrical cavity 82 formed in a housing endwall 83. This endwall is also machined to provide an annular cavity 84 into which the skirt 77 of outer piston member 75 is slidably received. Cavity 84 is vented by holes 85 drilled through endwall 83. The rearward end of control piston member 80 is turned down to provide a stem 86 that projects through cavity 82 and out of the housing through a clearance hole 87 in endwall 83. Cavity 82 is filled with a damping fluid 88. A conical valve element 90, carried at the forward end of the control piston 80, engages valve seat 79 to close injection port 78 while piston members 75 and 80 are in their quiescent positions illustrated in FIG. 7.

When the pyrotechnic initiator 22 is detonated to pressurize the combustion chamber and the liquid propellant reservoir, the rising fluid pressure in the combustion chamber initially drives the control piston member 80 rearwardly, thus separating the valve element 90 from valve seat 79 to open the liquid propellant injection port 78. Liquid propellant then flows from the reservoir into the combustion chamber for combustion to initiate bag inflation when seal 38 ruptures to open vent 37. The rate at which the control piston member is driven rearwardly may be controlled by the clearance between the control piston stem 86 and hole 87 in endwall 83 through which damping fluid 88 in cavity 82 is expelled. The viscosity of the damping fluid will also play a role in controlling the velocity of the control piston member's rearward stroke and thus the opening size of the injection port 78. It will be appreciated that the outer piston member 75 merely follows the rearward movement of the control piston member 80 to take up the volume of the reservoir 48 vacated by the liquid propellent regeneratively pumped through the injection port 78 into the combustion chamber.

Figure 7:
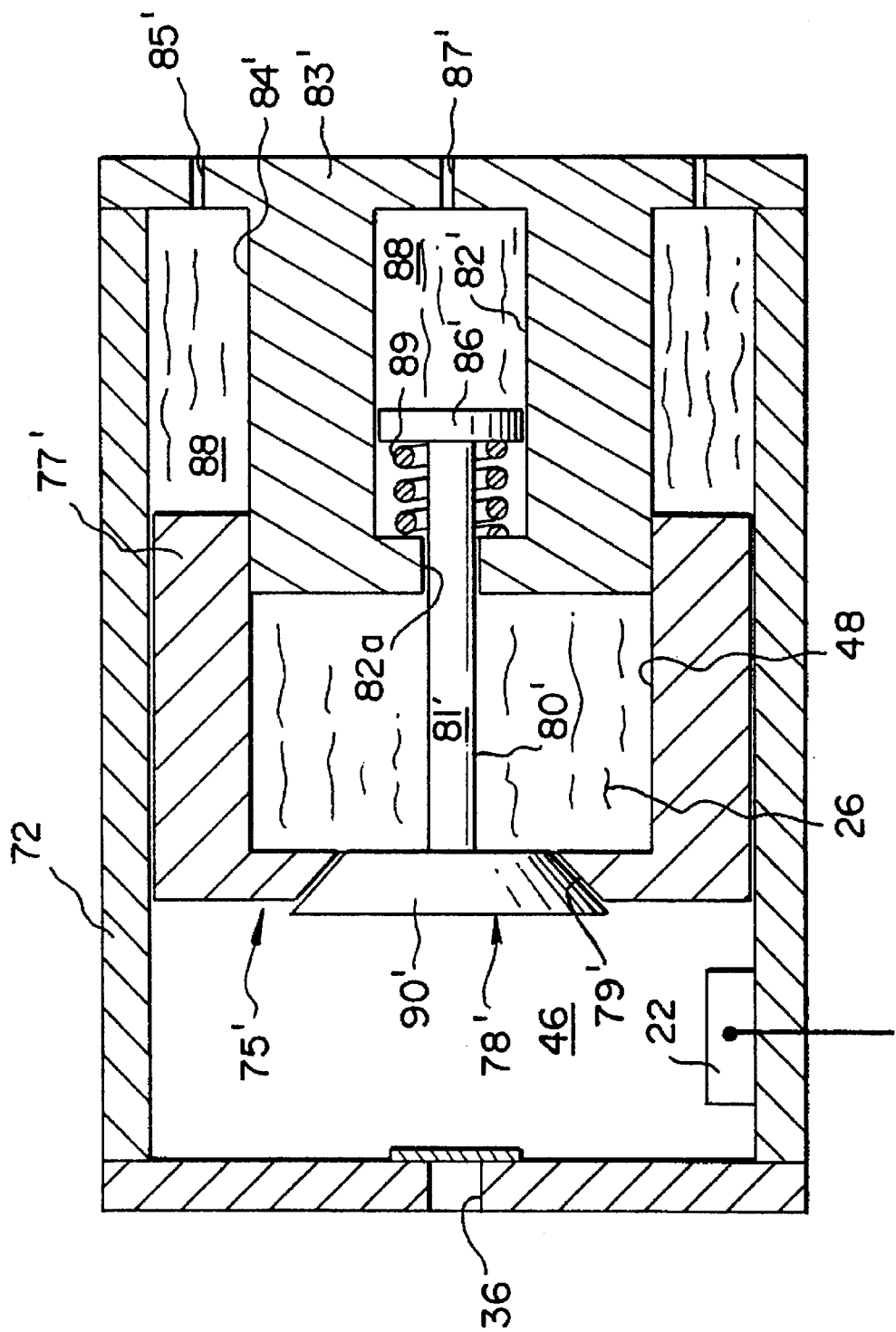
FIG. 7 is a sectional view illustrating a modification of the restraint apparatus of FIG. 6.

FIG. 7 illustrates an alternative arrangement of the two-part piston 74 in FIG. 6, wherein the outer piston member 75 serves as the control piston and the inner piston member 80 serves as the controlled piston. Thus, as illustrated in FIG. 7, the orientation of valve seat 79' is reversed to taper outwardly toward combustion chamber 46, as is the taper of conical valve element 90' carried at the forward end of inner piston member 80'. Piston body 81' is turned down to a reduced diameter so as to slidingly fit through an opening 82a into an expanded diameter, endwall cavity 82'. A circular flange 86' is affixed to the end of piston body 81' to serve as a stop for a compression spring 89 acting to rearwardly bias valve element 90' against valve seat 79' and thus close injection port 78'.

When the pyrotechnic initiator 22 is detonated to pressurize the combustion chamber 46 and the liquid propellant reservoir 48, outer piston member 75' is driven rearwardly to separate valve element 90' from valve seat 79' and open injection port 78'. Liquid propellant 26 is regeneratively pumped into the combustion chamber for combustion, initiating bag inflation. To control the rate of rearward stroke of the outer piston member 75', and thus to vary the injection port open size, annular cavity 84' is filled with a damping fluid 88, that is expelled through endwall vent holes 85' as piston skirt 77' contracts the cavity volume. The follow-up rearward stroke of the inner piston 80' may also be regulated by providing damping fluid 88 in cavity 82', that is expelled through vent hole 87'.

Figure 8:
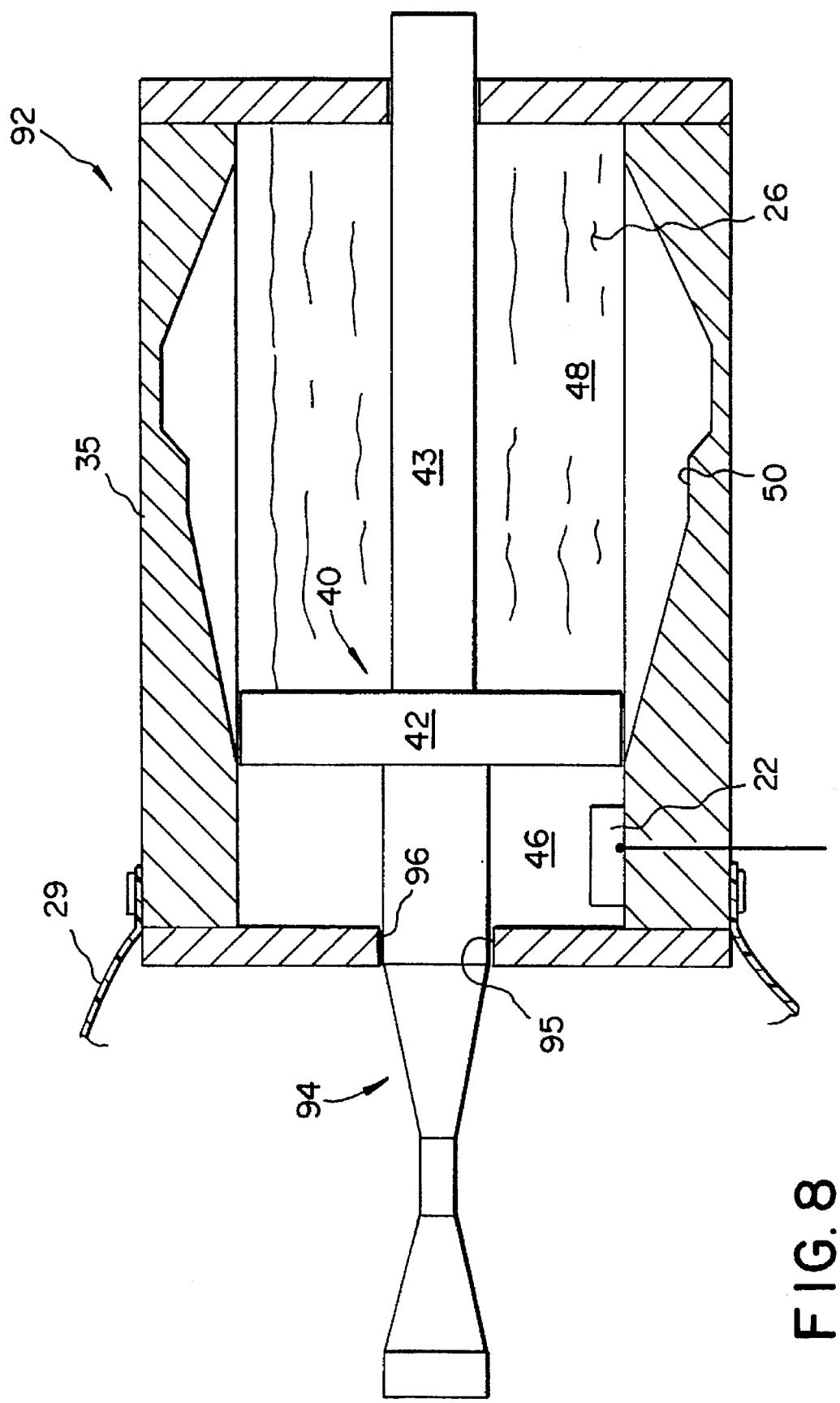
FIG. 8 is a sectional view of a vehicle occupant restraint apparatus according to still another embodiment of the present invention.

The vehicle occupant restraint apparatus embodiment of the invention illustrated in FIG. 8 utilizes an inflator, generally indicated at 92, that corresponds to inflator 34 of FIG. 3, except for the added feature of a needle valve element 94 projecting forwardly from piston head 42 through a vent 95 in the housing front endwall that opens into the interior of airbag 39. As illustrated, the surface of needle valve 94 is profiled to initially close vent 95, as indicated at 96, and, as it moves through its rearward stroke with piston 40, then to vary the opening size of vent 95 in coordination with the variation of the injection port opening achieved by the presence of profiled grooves 50 cut into the housing interior surface. It will be appreciated that varying both the liquid propellant injection rate and the inflation gas flow rate increases the capability of ideally programming bag deployment, such as to not only protect a vehicle occupant against injury resulting from a vehicle accident, but also from injury resulting from bag inflation.

From the foregoing description, it is seen that the present invention provides an improved vehicle occupant restraint apparatus and inflator capable of programming the rate of airbag inflation over a complete inflation period. By providing an initial, low liquid propellant injection rate, initial bag inflation can be retarded to minimize occupant injury that may otherwise occur due to rapid initial bag inflation. Moreover, since initial liquid propellant combustion can be at a low rate, the combustion chamber dimensions can be reduced. This affords savings in terms of inflator size and the ability to use a smaller inflation initiator. Also, peak operating fluid pressures may be reduced to the point of achieving a substantially uniform operating pressure over the inflation period, as illustrated in FIG. 2. This is due to the fact that the combustion chamber expands and as the liquid propellant reservoir contracts in a direct relation to the liquid propellent injection rate. Consequently, a less physically robust inflator construction is required, with consequent savings in size, weight, and material costs.

The embodiments of FIGS. 3 and 4 are described as utilizing a compressible fluid pocket in the liquid propellant reservoir to permit initial piston motion sufficient to open the injection port. However, it will be appreciated that, instead, a pressure rupturable, fluid sealing material, such as caulk, may be applied between the piston head peripheral surface and the leading end portions of the grooves 50 in the embodiment of FIG. 3. In the embodiment of FIG. 4, caulk may be applied between valve section 63 and port sidewall 60 to provide the requisite frangible fluid seal between the combustion chamber and the liquid propellant reservoir while the inflator is in its quiescent state.

It will be apparent to those skilled in the art that various modifications and variations can be made in the safety bag inflation apparatus of the present invention without departing from the spirit or scope of the invention. Thus, it is intended that the present invention cover the modifications and variations of this invention provided they come within the scope of the appended claims and their equivalents.

What is claimed is:

1. An occupant restraint apparatus for installation in a vehicle, comprising:

an inflatable airbag;

a housing having a vent in fluid communication with the airbag;

a cylinder provided in the housing;

a piston slidably received in the cylinder to define, to a back side, a reservoir containing a liquid propellant and, to a front side, a combustion chamber in fluid communication with the housing vent;

a sensor;

an inflation initiator operable, in response to a vehicle collision detected by the sensor, to generate fluid pressure in the combustion chamber that acts on the piston to generate an amplified fluid pressure in the reservoir; and a liquid propellant injection port provided between the reservoir and the combustion chamber, the injection port being closed while the piston is in a quiescent position and opening as the piston moves rearwardly to decrease reservoir volume, an opening area of the injection port varying as a function of piston travel in the rearward direction to achieve a variable flow rate of liquid propellant regeneratively pumped by the amplified reservoir fluid pressure through the injection port into the combustion chamber for ignition and sustained combustion to generate, by exothermic reaction, a gas flowing through the housing vent to produce inflation of the airbag.

2. The apparatus defined in claim 1, wherein the injection port is defined at an interface between the piston and the cylinder.

3. The apparatus defined in claim 1, wherein the injection port is defined by a gap between a peripheral surface of the piston and a surface of the cylinder, the gap varying in dimension during rearward travel of the piston.

4. The apparatus defined in claim 3, wherein the gap dimension progressively increases to a maximum value when the piston reaches a predetermined segment of the piston rearward travel.

5. The apparatus defined in claim 1, wherein the injection port is defined by a grooved surface of the cylinder.

6. The apparatus defined in claim 5, wherein the cylinder surface includes a plurality of angularly spaced, elongated grooves of varying cross sectional area in the direction of rearward piston travel to define a plurality of injection ports.

7. The apparatus defined in claim 2, wherein the interface is sealed against liquid propellant leakage while the piston is in the quiescent position.

8. The apparatus defined in claim 7, wherein the reservoir further contains a pocket of compressible fluid.

9. The apparatus defined in claim 1, wherein the injection port is defined by a gap between an aperture in the piston and a stationary valve element slidably received through the aperture and having a cross section that varies along a length of the valve element parallel to the direction of piston rearward travel.

10. The apparatus defined in claim 9, wherein the valve element cross section includes a forward portion providing a fluid seal with the piston aperture to close the injection port in the quiescent piston portion.

11. The apparatus defined in claim 10, wherein the valve element cross section includes an intermediate portion of decreasing cross sectional area rearwardly of the forward portion, followed by a medial portion of minimum cross sectional area for creating maximum injection port opening area.

12. The apparatus defined in claim 10, wherein the reservoir further contains a pocket of compressible fluid.

13. The apparatus defined in claim 1, wherein the piston includes an outer piston member slidably received in the cylinder and an inner piston member slidably received in a cylindrical cavity coaxial with the cylinder, and the injection port being defined by valve elements carried by the outer and inner piston members, the valve elements closing the injection port while the outer and inner piston members are in the piston quiescent position and variably separating to vary the injection port opening area as the outer and inner piston member travel rearwardly independent of each other.

14. The apparatus defined in claim 13, wherein the outer piston member includes a piston head, and the valve elements include an opening through the piston head bounded by an annular valve seat and a conical valve member carried at a forward end of the inner piston member for engagement with the valve seat to close the injection port.

15. The apparatus defined in claim 14, further comprising a spring biasing the conical valve member toward engagement with the valve seat.

16. The apparatus defined in claim 15, wherein the outer piston member further includes a rearwardly extending, annular skirt joined to the piston head and slidably received in an annular cavity coaxial with the cylinder, the annular cavity containing a damping fluid.

17. The apparatus defined in claim 13, further comprising a damping fluid contained in the cylindrical cavity.

18. The apparatus defined in claim 1, further including an elongated valve element carried by the piston for forward extension through the housing vent, the valve element varying in cross section along a length thereof, such that rearward travel of the valve element with the piston varies an opening area of the housing vent.

19. An inflator for inflating an airbag of an occupant restraint apparatus for installation in a vehicle, comprising:

a housing having a vent;

a cylinder provided in the housing;

a piston slidably received in the cylinder to define, to a back side, a reservoir containing a liquid propellant and, to a front side, a combustion chamber in fluid communication with the housing vent;

an inflation initiator positioned in the combustion chamber and operable to generate fluid pressure in the combustion chamber that acts on the piston to generate an amplified fluid pressure in the reservoir; and a liquid propellant injection port provided between the reservoir and the combustion chamber, the injection port being closed while the piston is in a quiescent position and opening as the piston moves rearwardly to decrease reservoir volume, an opening area of the injection port varying as a function of piston travel in the rearward direction to achieve a variable flow rate of liquid propellant regeneratively pumped by the amplified reservoir fluid pressure through the injection port into the combustion chamber for ignition and sustained combustion to generate, by exothermic reaction, an airbag inflating gas flowing through the housing vent.

20. The inflator defined in claim 19, wherein the injection port is defined at an interface between a piston surface and a cylinder surface.

21. The inflator defined in claim 19, wherein the injection port is defined by a gap between a peripheral surface of the piston and a surface of the cylinder, the gap varying in dimension during rearward travel of the piston.

22. The inflator defined in claim 21, wherein the gap dimension progressively increases to a maximum value when the piston reaches a mid-portion of the piston rearward travel.

23. The inflator defined in claim 20, wherein the cylinder surface is grooved.

24. The inflator defined in claim 20, wherein the cylinder surface includes a plurality of angularly spaced, elongated grooves of varying cross sectional area in the direction of rearward piston travel to define a plurality of injection ports.

25. The inflator defined in claim 20, wherein the interface is sealed against liquid propellant leakage while the piston is in the quiescent position.

26. The inflator defined in claim 25, wherein the reservoir further contains a pocket of compressible fluid.

27. The inflator defined in claim 19, wherein the injection port is defined by a gap between an aperture in the piston and a stationary valve element slidably received through the aperture and having a cross section that varies along a length of the valve element parallel to the direction of piston rearward travel.

28. The inflator defined in claim 27, wherein the valve element cross section includes a forward portion providing a fluid seal with the piston aperture to close the injection port in the quiescent piston portion.

29. The inflator defined in claim 28, wherein the valve element cross section includes an intermediate portion of decreasing cross sectional area rearwardly of the forward portion, followed by a medial portion of minimum cross sectional area for creating maximum injection port opening area.

30. The inflator defined in claim 28, wherein the reservoir further contains a pocket of compressible fluid.

31. The inflator defined in claim 19, wherein the piston includes an outer piston member slidably received in the cylinder and an inner piston member slidably received in a cylindrical cavity coaxial with the cylinder, and the injection port being defined by valve elements carried by the outer and inner piston members, the valve elements closing the injection port while the outer and inner piston members are in the piston quiescent position and variably separating to vary the injection port opening area as the outer and inner piston member travel rearwardly independent of each other.

32. The inflator defined in claim 31, wherein the outer piston member includes a piston head, and the valve elements include an opening through the piston head bounded by an annular valve seat and a conical valve member carried at a forward end of the inner piston member for engagement with the valve seat to close the injection port.

33. The inflator defined in claim 32, further comprising a spring biasing the conical valve member toward engagement with the valve seat.

34. The inflator defined in claim 33, wherein the outer piston member further includes a rearwardly extending, annular skirt joined to the piston head and slidably received in an annular cavity coaxial with the cylinder, the annular cavity containing a damping fluid.

35. The inflator defined in claim 31, further comprising a damping fluid contained in the cylindrical cavity.

36. The inflator defined in claim 19, further including an elongated valve element carried by the piston for forward extension through the housing vent, the valve element varying in cross section along a length thereof, such that rearward travel of the valve element with the piston varies an opening area of the housing vent.

37. The inflator defined in claim 36, wherein the valve element includes a forward end portion closing the housing vent.

38. An inflator for a vehicle occupant restraint apparatus, comprising:
   a housing providing a cylinder;
   a piston slidably received in the cylinder to divide a cylinder volume into a reservoir containing a liquid propellant and a combustion chamber in fluid communication with a housing vent;
   an inflation initiator operable, in response to a vehicle collision, to generate fluid pressure in the combustion chamber that acts on the piston to generate an amplified fluid pressure in the reservoir; and
   a liquid propellant injection port provided between the reservoir and the combustion chamber and defined in part by the piston, the injection port varying in size as a function of piston motion to achieve a variable flow rate of liquid propellant regeneratively pumped through the injection port into the combustion chamber for combustion and generation of an airbag inflation gas flowing through the housing vent.

39. The inflator defined in claim 38, wherein the injection port is closed while the piston resides in a quiescent position prior to initiator operation.

40. The inflator defined in claim 38, wherein the injection port is provided at an interface between the piston and a wall of the cylinder.

41. The inflator defined in claim 38, wherein the injection port is provided by a gap between a peripheral surface of the piston and a surface of the cylinder, the gap varying in dimension in a direction of piston motion.

42. The inflator defined in claim 41, wherein the gap dimension progressively increases to a maximum value when the piston reaches a predetermined position of the piston motion.

43. The inflator defined in claim 38, wherein the injection port is defined by a grooved surface of the cylinder.

44. The inflator defined in claim 43, wherein the cylinder surface includes a plurality of angularly spaced, elongated grooves varying in cross sectional area in a direction of piston motion to define a plurality of varying size injection ports.

45. The inflator defined in claim 38, wherein the injection port is defined by a gap between an aperture in the piston and a stationary valve element slidably received through the aperture and having a cross section that varies along a length of the valve element in the direction of piston motion.

46. The inflator defined in claim 45, wherein the valve element cross section includes a forward portion providing a fluid seal with the piston aperture to close the injection port while the piston is in a quiescent position prior to initiator operation.

47. The inflator defined in claim 46, wherein the valve element cross section includes an intermediate portion of decreasing cross sectional area rearwardly of the forward portion, followed by a medial portion of minimum cross sectional area for creating a maximum injection port size.

48. The inflator defined in claim 46, wherein the reservoir further contains a pocket of compressible fluid.

49. The inflator defined in claim 39, wherein the piston includes an outer piston member slidably received in the cylinder and an inner piston member slidably received in a cylindrical cavity coaxial with the cylinder, and the injection port being defined by valve elements carried by the outer and inner piston members, the valve elements closing the injection port while the outer and inner piston members are in the piston quiescent position and variably separating to vary the injection port size as the outer and inner piston member travel independent of each other in a direction of piston motion.

50. The inflator defined in claim 49, wherein the outer piston member includes a piston head, and the valve elements include an opening through the piston head bounded by an annular valve seat and a conical valve member carried at a forward end of the inner piston member for engagement with the valve seat to close the injection port.

51. The inflator defined in claim 50, wherein the outer piston member further includes an axially extending, annular skirt joined to the piston head and slidably received in an annular cavity coaxial with the cylinder, the annular cavity containing a damping fluid.

52. The inflator defined in claim 49, further comprising a damping fluid contained in the cylindrical cavity.

53. The inflator defined in claim 38, further including an elongated valve element carried by the piston for extension through the housing vent, the valve element varying in cross section along a length thereof, such that movement of the valve element with the piston varies an opening area of the housing vent.

54. The inflator defined in claim 38, wherein the housing is an inner housing and the housing vent is an inner housing vent, the inflator further comprising an outer housing surrounding the inner housing in spaced relation to define an annular cavity in fluid flow communication with the combustion chamber through the inner housing vent, the outer housing including a plurality of exhaust vents through which the inflation gas flows to deploy an airbag affixed to the outer housing.

* * * * *